US010598101B2

(12) United States Patent
Sarder et al.

(10) Patent No.: US 10,598,101 B2
(45) Date of Patent: Mar. 24, 2020

(54) DUAL FUEL SELECTOR SWITCH

(71) Applicant: Champion Engine Technology, LLC, Sussex, WI (US)

(72) Inventors: Mark J. Sarder, Waukesha, WI (US); Leigh Jenison, Hartland, WI (US); Ian Schmit, Cedarburg, WI (US)

(73) Assignee: Champion Power Equipment, Inc., Santa Fe Springs, CA (US)

( * ) Notice: Subject to any disclaimer, the term of this patent is extended or adjusted under 35 U.S.C. 154(b) by 584 days.

(21) Appl. No.: 15/015,205

(22) Filed: Feb. 4, 2016

(65) Prior Publication Data

US 2016/0146122 A1 May 26, 2016

Related U.S. Application Data

(63) Continuation of application No. 14/069,747, filed on Nov. 1, 2013, now Pat. No. 9,435,273.

(51) Int. Cl.
*F02D 19/06* (2006.01)
*F02M 13/08* (2006.01)
*F02D 29/06* (2006.01)

(52) U.S. Cl.
CPC ..... *F02D 19/0676* (2013.01); *F02D 19/0613* (2013.01); *F02D 19/0647* (2013.01);
(Continued)

(58) Field of Classification Search
CPC ............. F02D 19/0676; F02D 19/0613; F02D 19/0647; F02D 29/06; F02D 19/0681;
(Continued)

(56) References Cited

U.S. PATENT DOCUMENTS 2,722,208 A 11/1955 Conroy, Jr. et al.
3,384,059 A 5/1968 Kopa
(Continued)

FOREIGN PATENT DOCUMENTS

CN 2060477 U 8/1990
CN 1981121 A 6/2007

OTHER PUBLICATIONS

Honda EU20i LPG, Mar. 20, 2012, https://www.youtube.com/watch?v=yBpq33aJmR0.
(Continued)

*Primary Examiner* — Syed O Hasan
(74) *Attorney, Agent, or Firm* — Ziolkowski Patent Solutions Group, SC (57) ABSTRACT

A fuel selector for use with a dual fuel generator includes a selector plate, a first fuel valve assembly positioned adjacent the selector plate and actuatable between an ON position and an OFF position to selectively control a first fuel flow to an engine of the dual fuel generator, and a second fuel valve assembly positioned adjacent the selector plate and actuatable between an ON position and an OFF position to selectively control a second fuel flow to the engine of the dual fuel generator. A selector switch coupled to the selector plate is linearly translatable from a first position to a second position, so as to enable positioning of only one of the first fuel valve assembly and the second fuel valve assembly in the ON position at a given time, such that the first and second fuel valve assemblies cannot be in the ON position concurrently.

19 Claims, 6 Drawing Sheets

(52) U.S. Cl.
CPC .............. F02D 29/06 (2013.01); F02M 13/08 (2013.01); *Y02T 10/36* (2013.01); *Y10T 137/0318* (2015.04); *Y10T 137/0491* (2015.04); *Y10T 137/87684* (2015.04)

(58) Field of Classification Search
CPC .......... F02M 21/0293; F02M 21/0236; F02M 21/0233; F02M 13/08; F02M 21/21; F02B 53/00; F02B 63/00; H02K 1/22
USPC .................. 123/525, 2, 3; 290/1 A; 137/383
See application file for complete search history.

(56) References Cited

U.S. PATENT DOCUMENTS

| | | | |
|---|---|---|---|
| 3,412,258 A | 11/1968 | Satter | |
| 3,659,574 A | 5/1972 | Reschke et al. | |
| 3,718,000 A | 2/1973 | Walker | |
| 3,783,849 A | 1/1974 | Bramfitt | |
| 3,888,223 A | 6/1975 | Mondt | |
| 4,335,697 A | 6/1982 | McLean | |
| 4,372,276 A | 2/1983 | Bernhardsson et al. | |
| 4,373,493 A | 2/1983 | Welsh | |
| 4,393,848 A | 7/1983 | Poehlman | |
| 4,450,821 A | 5/1984 | Venning et al. | |
| 4,463,735 A | 8/1984 | Stoltman | |
| 4,480,595 A | 11/1984 | Hobby et al. | |
| 4,489,699 A * | 12/1984 | Poehlman | F02B 69/04 123/525 |
| 4,502,453 A | 3/1985 | Kabasin et al. | |
| 4,619,240 A | 10/1986 | Bedford et al. | |
| 4,628,871 A | 12/1986 | Glass | |
| 4,708,094 A | 11/1987 | Helmich et al. | |
| 4,895,124 A | 1/1990 | Bartholomew | |
| 4,979,480 A | 12/1990 | Daikoku et al. | |
| 5,092,305 A | 3/1992 | King | |
| 5,161,496 A | 11/1992 | Matsushima et al. | |
| 5,171,487 A | 12/1992 | Hudz | |
| 5,228,423 A | 7/1993 | Oikawa et al. | |
| 5,287,839 A | 2/1994 | Kondou et al. | |
| 5,320,078 A | 6/1994 | Lorraine | |
| 5,325,835 A | 7/1994 | Kimata et al. | |
| 5,379,740 A | 1/1995 | Moore et al. | |
| 5,419,291 A | 5/1995 | Kimata et al. | |
| 5,438,968 A | 8/1995 | Johnson et al. | |
| 5,450,832 A | 9/1995 | Graf | |
| 5,611,312 A | 3/1997 | Swanson et al. | |
| 5,673,670 A | 10/1997 | Powell et al. | |
| 5,809,979 A | 9/1998 | Tsuda et al. | |
| 5,816,224 A | 10/1998 | Welsh et al. | |
| 6,082,323 A | 7/2000 | Winberg | |
| 6,213,083 B1 | 4/2001 | Winberg | |
| 6,223,730 B1 | 5/2001 | Hasegawa et al. | |
| 6,276,345 B1 | 8/2001 | Nelson et al. | |
| 6,401,685 B1 | 6/2002 | Warner | |
| 6,453,877 B1 | 9/2002 | Lucier et al. | |
| 6,591,817 B2 | 7/2003 | Deutsch | |
| 6,914,342 B1 | 7/2005 | French | |
| 7,905,469 B2 | 3/2011 | Nickels et al. | |
| 8,342,158 B2 | 1/2013 | Ulrey et al. | |
| 8,590,510 B2 | 11/2013 | Surnilla et al. | |
| 9,435,273 B2 | 9/2016 | Sarder et al. | |
| 2002/0125115 A1* | 9/2002 | Burkholder | F02B 63/04 200/51.11 |
| 2002/0134362 A1 | 9/2002 | Deutsch | |
| 2004/0139943 A1 | 7/2004 | Kern et al. | |
| 2004/0240141 A1* | 12/2004 | Stolt | H01H 47/18 361/160 |
| 2006/0169238 A1* | 8/2006 | Mazuka | F02B 63/04 123/179.18 |
| 2007/0137591 A1* | 6/2007 | Sugimoto | F02B 43/00 123/41.7 |
| 2010/0258099 A1 | 10/2010 | Andersson et al. | |
| 2011/0168133 A1 | 7/2011 | Pursifull et al. | |
| 2011/0253102 A1 | 10/2011 | Watanabe | |
| 2013/0047964 A1 | 2/2013 | Kim | |
| 2013/0098349 A1 | 4/2013 | Deng | |
| 2013/0122439 A1 | 5/2013 | Deng | |
| 2013/0220274 A1 | 8/2013 | Deshpande et al. | |
| 2014/0202430 A1 | 7/2014 | Monros | |
| 2014/0238340 A1 | 8/2014 | Dunn et al. | |
| 2014/0373531 A1 | 12/2014 | Wong | |
| 2015/0122230 A1 | 5/2015 | Sarder et al. | |

OTHER PUBLICATIONS

Johnson et al., "Electronic Direct Fuel Injection (EDFI) for Small Two-Stroke Engines," SAE Technical Paper 1999-01-3312, Proceedings of the 1999 SAE Small Engine Technology Conference, Madison, WI, Sep. 28-30, 1999, pp. 1-15.

Champion Power (Dec. 2014, & Jan.) 100153 Manual, Retrieved from http://www.championpowerequipment.com/media/2400/100153_manual-english_12-4-14.pdf.

* cited by examiner

DUAL FUEL SELECTOR SWITCH

CROSS-REFERENCE TO RELATED APPLICATION

The present invention is a continuation of and claims the benefit of U.S. Ser. No. 14/069,747, filed on Nov. 1, 2013, the disclosure of which is incorporated herein by reference in its entirety.

BACKGROUND OF THE INVENTION

Embodiments of the invention relate generally to dual fuel generators and, more particularly, to a selector switch for use on a dual fuel generator that is configured to ensure that only one type of fuel may be in use at a given time in the generator.

Engine-driven, electrical generators are used in a wide variety of applications. Typically, an electrical generator utilizes a single driving engine directly coupled to a generator or alternator through a common shaft. Upon activation of the generator, a fuel and air mixture is provided to the combustion chambers of corresponding cylinders of the engine. The fuel mixture in each combustion chamber is ignited causing an explosion within the cylinders. The explosive forces within the combustion chambers in the cylinders cause linear motion of the pistons within their corresponding cylinders. The linear motion of the pistons is converted into rotational motion by a crankshaft that, in turn, drives the alternator. As is conventional, the driven alternator generates electrical power.

Certain generators are defined as "dual fuel" generators that include an engine having the ability to be fueled with either of two fuels, such as either gasoline or liquefied petroleum gas (LPG), for example. These "dual fuel" engines may selectively operate on gasoline or LPG as desired and controlled by an operator, such as being operated on LPG/gasoline for a first period of operation and selectively switching over to the other of LPG/gasoline for another period of operation, with such a switching of fuels being controlled as desired by an operator. Typical dual fuel generators utilize separate valves for each fuel type, such as an LPG valve and a gasoline valve, to control flow of the respective fuels to the engine. While the existence of two separate valves allows one fuel type to have its valve "on" while the other has its valve "off," there is nothing to prevent both valves from being "on" at the same time. As such, it is possible for both valves to be in the "on" position, which can lead to a potentially unsafe condition resulting from the mixture of the fuels.

Therefore, it would be desirable to provide a dual fuel generator with a selector switch that would prohibit the mixing of two differing types of fuels. It would further be desirable for such a selector switch to inhibit positioning/actuation of the valves in such a manner that the valve for a first fuel source is prevented from being "on" when the valve for a second fuel source is "on", and vice versa.

BRIEF DESCRIPTION OF THE INVENTION

In accordance with one aspect of the invention, a fuel selector for use with a dual fuel generator includes a selector plate, a first fuel valve assembly positioned adjacent the selector plate and actuatable between an ON position and an OFF position to selectively control a first fuel flow to an engine of the dual fuel generator, and a second fuel valve assembly positioned adjacent the selector plate and actuatable between an ON position and an OFF position to selectively control a second fuel flow to the engine of the dual fuel generator. The fuel selector also includes a selector switch coupled to the selector plate so as to be linearly translatable from a first position to a second position, wherein translation of the selector switch between the first and second positions enables positioning of only one of the first fuel valve assembly and the second fuel valve assembly in the ON position at a given time, such that the first and second fuel valve assemblies cannot be in the ON position concurrently.

In accordance with another aspect of the invention, a method of controlling fuel flow in a dual fuel generator includes providing a first fuel valve assembly to control fuel flow from a first fuel source to an internal combustion engine of the dual fuel generator, the first fuel valve assembly including a first fuel valve handle movable between an ON position and an OFF position to control fuel flow from the first fuel source to the internal combustion engine. The method also includes providing a second fuel valve assembly to control fuel flow from a second fuel source to the internal combustion engine of the dual fuel generator, the second fuel valve assembly including a second fuel valve handle movable between an ON position and an OFF position to control fuel flow from the second fuel source to the internal combustion engine. The method further includes providing a fuel selector switch adjacent the first fuel valve assembly and the second fuel valve assembly such that the fuel selector switch is translatable to a first position and a section position, wherein the fuel selector switch is translatable between the first position and the section position to selectively inhibit actuation of the first fuel valve handle and the second fuel valve handle, so as to prevent a simultaneous flow of fuels from the first and second fuel sources to the internal combustion engine.

In accordance with yet another aspect of the invention, a dual fuel generator includes a first fuel source, a second fuel source, and an internal combustion engine coupled to the first fuel source and the second fuel source to selectively receive fuel therefrom. The dual fuel generator also includes a fuel selector configured to control a flow of fuel from the first and second fuel sources to the internal combustion engine, with the fuel selector comprising a first fuel valve assembly including a first fuel valve and a first fuel valve handle that is actuatable between an open position and a closed position to selectively open and close the first fuel valve, a second fuel valve assembly including a second fuel valve and a second fuel valve handle that is actuatable between an open position and a closed position to selectively open and close the second fuel valve, a selector plate having the first fuel valve assembly and the second fuel valve assembly coupled to a front side thereof, and a selector switch slideably coupled to the selector plate so as to be movable from a first position to a second position. Positioning of the selector switch in the first position causes the selector switch to cover the second fuel valve handle so as to prevent the second fuel valve handle from moving to the open position and positioning of the selector switch in the second position causes the selector switch to cover the first fuel valve handle so as to prevent the first fuel valve handle from moving to the open position.

These and other advantages and features will be more readily understood from the following detailed description of preferred embodiments of the invention that is provided in connection with the accompanying drawings.

BRIEF DESCRIPTION OF THE DRAWINGS

The drawings illustrate embodiments presently contemplated for carrying out the invention.

In the drawings.

DETAILED DESCRIPTION

Figure 1:
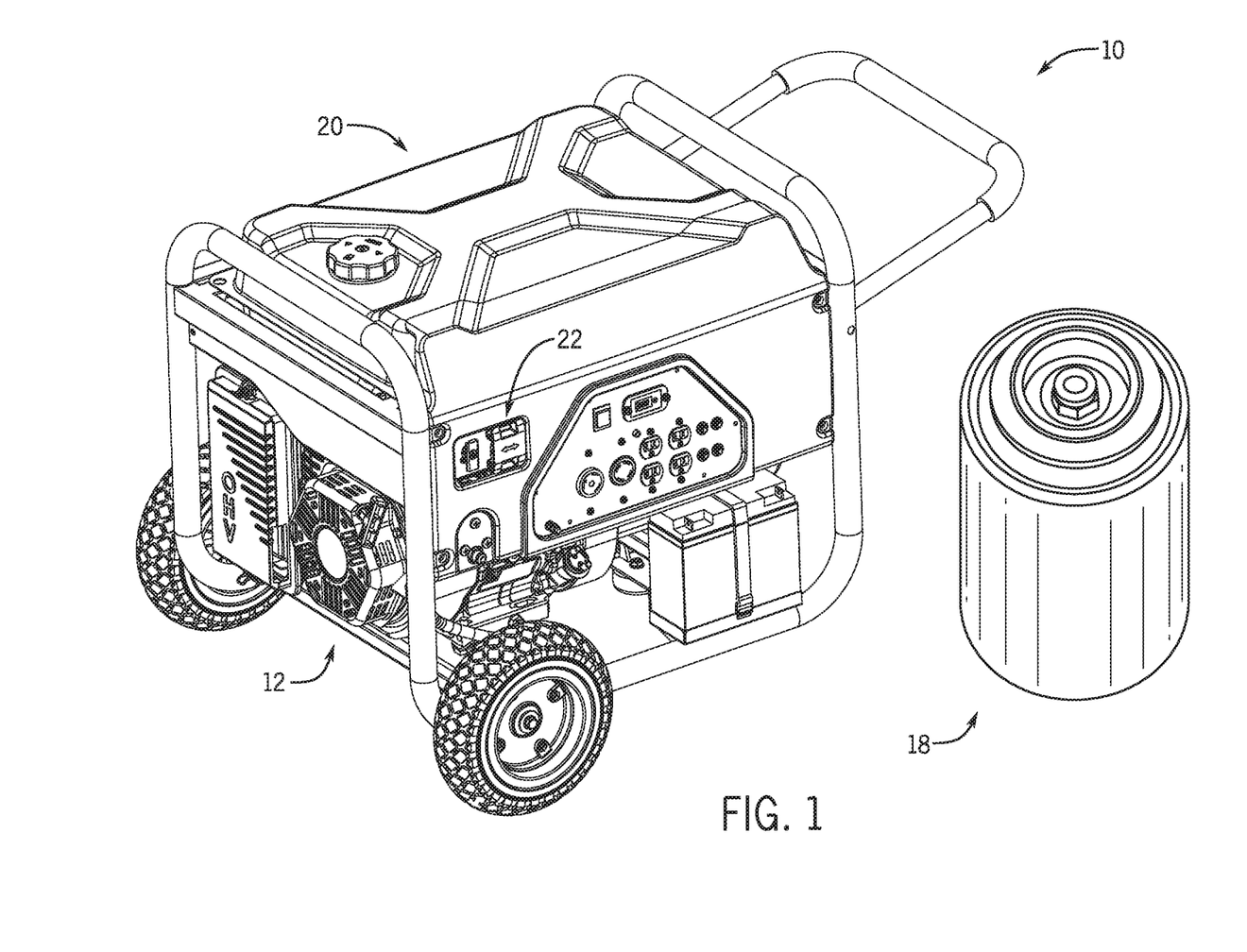
FIG. 1 is a perspective view of a dual fuel generator, according to an embodiment of the invention.
Figure 2:
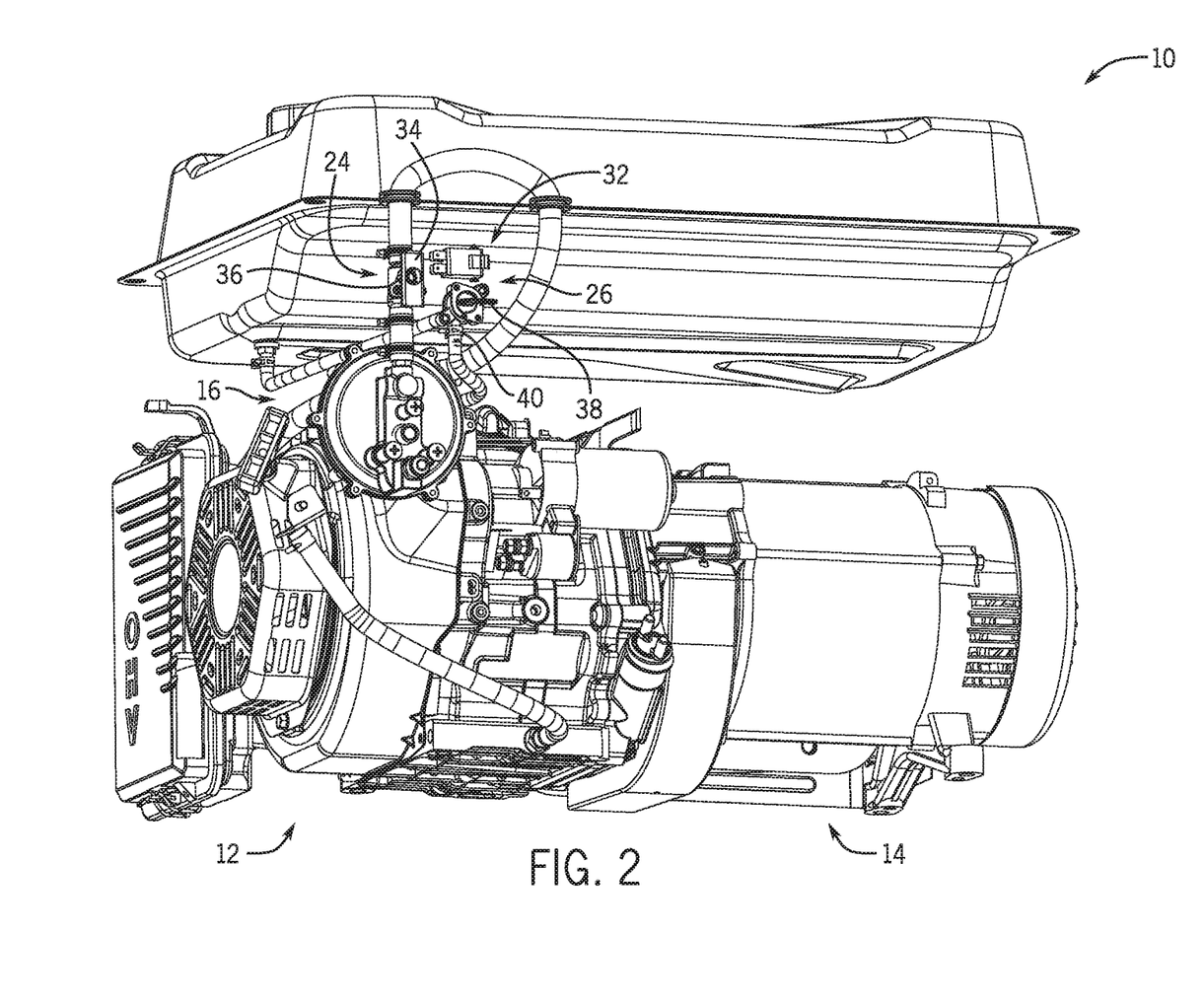
FIG. 2 is a partial view of the dual fuel generator of FIG. 1, according to an embodiment of the invention

Referring first to FIGS. 1 and 2, a dual fuel generator 10 is illustrated, according to an embodiment of the invention—with a perspective view of the generator 10 being shown in FIG. 1 and a more detailed partial view of the generator 10 being shown in FIG. 2 to further illustrate features thereof. Dual fuel generator 10 includes an internal combustible engine 12 operatively connected to an alternator 14 in a conventional manner. The engine 12 includes pistons (not shown) that are slideably received within corresponding cylinders (not shown) thereof, with each cylinder further including an intake valve for admitting a fuel-air mixture and an exhaust valve for venting exhaust gases following combustion. The fuel-air mixture is provided by a carburetor 16 that includes a movable throttle, with a position of the throttle regulating the amount of fuel and air admitted into the cylinders and thus the speed and power developed by the engine 12 when the air-fuel mixture is ignited to generate reciprocal movement of the pistons. The reciprocal movement of the pistons of engine 12 is translated to rotational movement by a crankshaft (not shown) that, in turn, drives the alternator 14, so as to generate an electrical output power from the generator 10.

As the generator 10 is a dual fuel generator, the engine 12 is designed to use different fuels from either a first fuel source 18 or a second fuel source 20. In an exemplary embodiment of the invention, first fuel source 18 supplies a liquefied petroleum gas (LPG) to the engine 12 and second fuel source 20 supplies gasoline to the engine 12, with the generator 10 selectively operating on LPG or gasoline as desired and controlled by an operator, such as for example operating on LPG for a first period of operation and then switching over to gasoline for another period of operation. However, it is contemplated that the first fuel source 18 and/or second fuel source 20 may be other types of fuel sources (e.g., natural gas, biodiesel, etc.), according to additional embodiments of the invention—and thus the scope of the invention is not meant to be limited strictly to a gasoline-LPG dual fuel embodiment.

For selectively controlling the flow of gasoline and LPG to the engine 12, dual fuel generator 10 includes a fuel selector 22 constructed to provide for selection of a desired fuel source 18, 20 for supplying fuel to engine 12. The fuel selector 22 not only provides for selection of a desired fuel source 18, 20 for supplying fuel to engine 12, but also selectively restricts the selection of a fuel source so as to enable the use of only one fuel at a time. As a result, fuel from first fuel source 18 cannot flow to engine 12 while fuel from second fuel source 20 is flowing to engine 12, and vice versa.

The fuel selector 22 of generator 10 is shown in greater detail in FIGS. 3-6 according to an embodiment of the invention. In general, the fuel selector 22 includes a first valve assembly 24, a second valve assembly 26, a selector plate 28, a selector switch 30, and a carburetor solenoid switch 32. These elements of the fuel selector 22 collectively function to provide for selective control of a fuel flow (of gasoline or LPG) to the engine 12, with the fuel selector 22 enabling selection of a desired fuel source 18, 20 to provide a fuel flow therefrom while also inhibiting the selection of the other fuel source 18, 20 so as to prevent a fuel flow therefrom, thereby enabling only a single fuel to flow to the engine 12 at one time.

Figure 3:
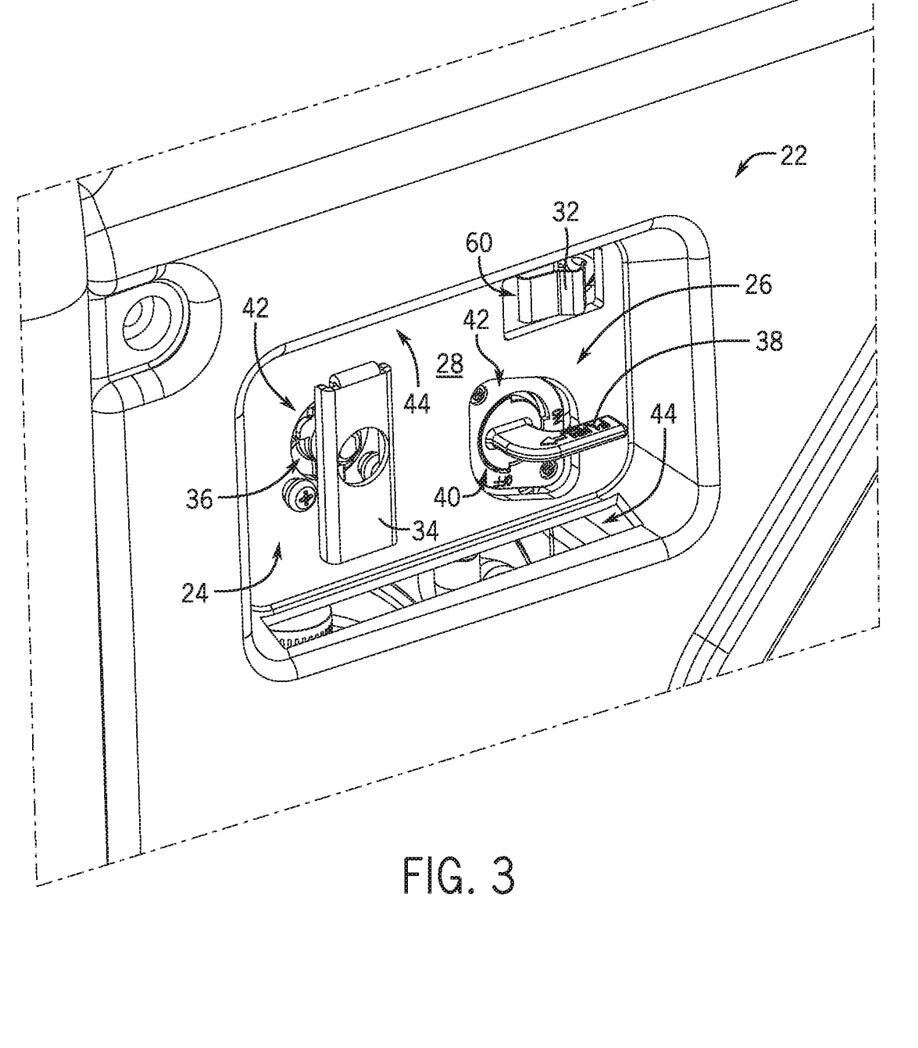
FIG. 3 is a front perspective view of a fuel selector for use with the dual fuel generator of FIG. 1, according to an embodiment of the invention.

Referring first to FIG. 3, a front view of fuel selector 22 is shown with selector switch 30 removed therefrom, so as to best illustrate the construction of the first valve assembly 24 and the second valve assembly 26. The first valve assembly 24 and the second valve assembly 26 are attached, respectively, to first fuel source 18 and second fuel source 20 to selectively control a flow of fuel from the fuel sources to the engine 12. First valve assembly 24 includes a first fuel valve handle 34 that is operatively connected to a first fuel valve 36 to control an opening and closing of the first fuel valve. Similarly, second valve assembly 26 includes a second fuel valve handle 38 that is operatively connected to a second fuel valve 40 to control an opening and closing of the second fuel valve.

Each of the first valve assembly 24 and the second valve assembly 26 are movable between an ON position and an OFF position to control opening and closing of their respective fuel valve. More specifically, first and second fuel valve handles 34, 38 are movable between an ON position and an OFF position, with the fuel valves 36, 40 being open (to enable fuel flow to the engine 12) when their respective fuel valve handle 34, 38 is in the ON position and being closed (to prevent fuel flow to the engine 12) when their respective fuel valve handle 34, 38 is in the OFF position. Thus, when first fuel valve handle 34 is in an ON position, first fuel valve 36 is open and allows the fuel from first fuel source 18 to flow to the engine 12, and when second fuel valve handle 38 is in an ON position, second fuel valve 40 is open and allows the fuel from second fuel source 20 to flow to the engine 12.

In the preferred embodiments of the invention, first valve assembly 24 and second valve assembly 26 are located adjacent to each other on the same horizontal plane or parallel horizontal planes. In such an embodiment, first valve assembly 24 is in the ON position when first fuel valve handle 34 is moved to a vertical orientation/position and first valve assembly 24 is in an OFF position when first fuel valve handle 34 is moved to a horizontal orientation/position. Similarly, second valve assembly 26 is in the ON position when second fuel valve handle 38 is moved to a vertical orientation/position second valve assembly 26 is in an OFF position when second fuel valve handle 38 is moved to a horizontal orientation/position. It is recognized, however, that an alternative embodiment of the invention may have first valve assembly 24 and second valve assembly 26 located adjacent to each other on the same vertical plane or parallel vertical planes. One having ordinary skill in the art would recognize that in such an alternative embodiment of the invention, first and second valve assemblies 24 would be in the ON position when their respective fuel valve handles 34, 38 are horizontal, and would be in the OFF position when their respective fuel valve handles 34, 38 are vertical.

As shown in FIG. 3, first valve assembly 24 and second valve assembly 26 are positioned adjacent to the selector plate 28 of fuel selector 22. The selector plate 28 may be integrally formed as part of a larger outer frame assembly of generator 10 or may be an insert attachable to such a frame assembly. Openings 42 are formed in selector plate 28 so as to accommodate positioning of the first valve assembly 24 and second valve assembly 26—with the openings 42 enabling positioning of first and second fuel valve handles 34, 38 in front of selector plate 28, such that they may be actuated by an operator of the generator 10 in order to open/close their respective valves 36, 40. Selector plate 28 also includes slots or grooves 44 formed therein that are positioned both above and below the first and second fuel valve handles 34, 38, with the slots 44 extending generally in a lengthwise fashion along a length of the selector plate 28. Each of the slots 44 is configured to receive a protrusion or flange formed on selector switch 30, such that the selector switch 30 can be slideably coupled to the selector plate 28—with the selector switch 30 being translatable in a linear fashion by way of its mating with the slots 44.

Figure 4:
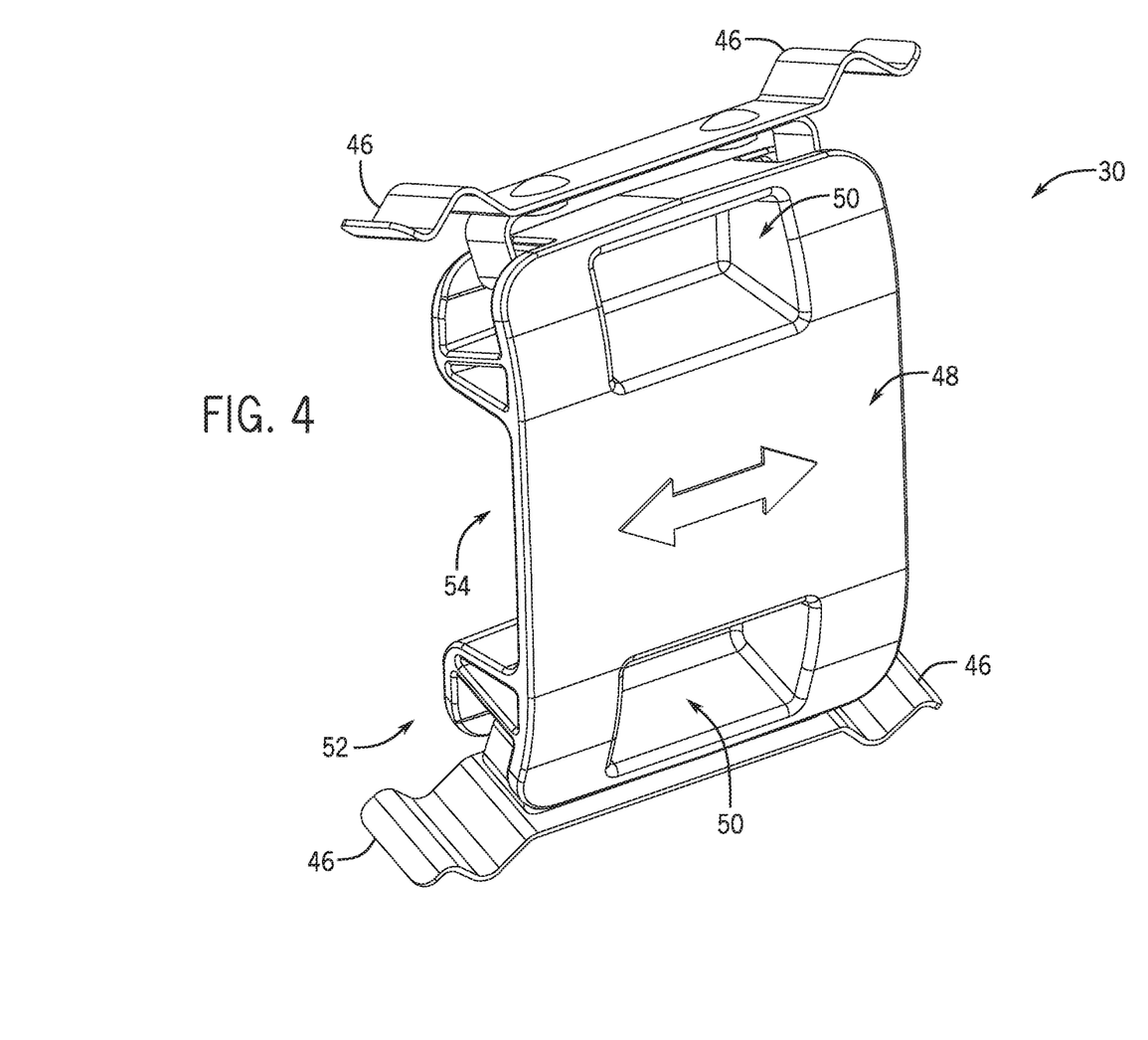
FIG. 4 is a front perspective view of a selector switch for use with the fuel selector of FIG. 3, according to an embodiment of the invention.
Figure 5:
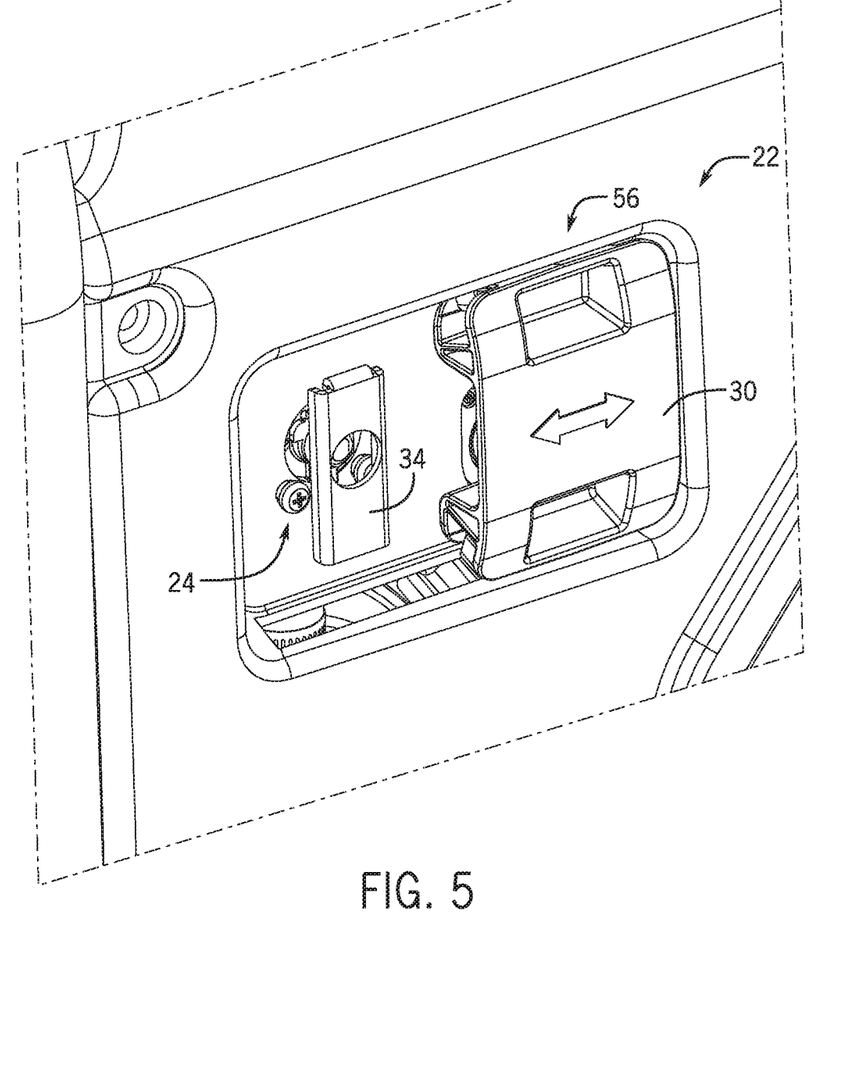
FIG. 5 is a front perspective view of the fuel selector of FIG. 3 with the selector switch in a first position, according to an embodiment of the invention.
Figure 6:
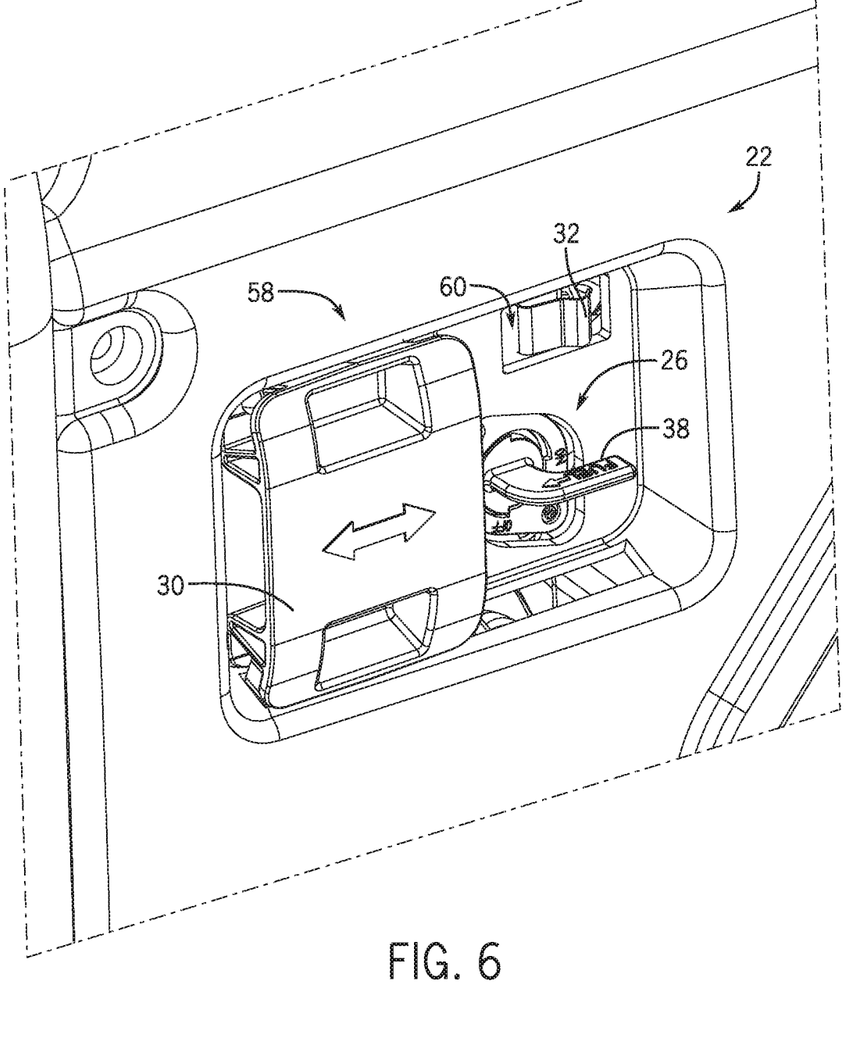
FIG. 6 is a front perspective view of the fuel selector of FIG. 3 with the selector switch in a second position, according to an embodiment of the invention.

Detailed views of the selector switch 30 and of its mating with the selector plate 28 are shown in FIGS. 4-6. Referring first to FIG. 4, the general structure of selector switch 30 is shown according to an exemplary embodiment. Protrusions or flanges 46 are formed on each of top and bottom surfaces of the selector switch 30 that are configured to mate with the corresponding slots 44 formed in selector plate 28 (FIG. 3). The protrusions 46 may be flexible so as to accommodate coupling of the selector switch 30 to the selector plate 28. A front surface 48 of selector switch 30 includes finger-hold depressions 50 formed therein that accommodate the fingers of an operator, with the finger-holds providing a convenient feature by which the operator can operate (i.e., slide) the selector switch 30. A back surface 52 of the selector switch 30 includes a groove or channel 54 formed therein having a width and depth sufficient to receive the first and second fuel valve handles 34, 38 therein when in their horizontal position (i.e., the OFF position). The groove 54 is further sized and configured such that the first and second fuel valve handles 34, 38 will not fit therein when in their vertical position (i.e., the ON position).

Positioning of the selector switch 30 relative to the selector plate 28 and first and second valve assemblies 24, 26 is shown in FIGS. 5 and 6. As shown therein, positioning of the first valve assembly 24 and second valve assembly 26 adjacent selector plate 28—and on the same horizontal plane—provides for selective positioning of the selector switch 30 relative to the fuel valve handles 34, 38 in what are generally referred to hereafter as a first position and a second position 56, 58. The selector switch 30 is translatable in a horizontal motion—via a sliding motion within slots 44 of the selector plate 28—from the first position 56 (FIG. 5) to the second position 58 (FIG. 6) to selectively restrict actuation of the first and second fuel valve handles 34, 38. As the groove 54 formed in selector switch 30 is configured such that the first and second fuel valve handles 34, 38 will not fit therein when in their vertical position (i.e., the ON position), it is recognized that in order to translate the selector switch 30 back and forth between the first and second positions 56, 58, both of the fuel valve handles 34, 38 must be in their horizontal OFF position.

In FIG. 5, selector switch 30 is illustrated in the first position 56. When selector switch 30 is in first position 56, selector switch 30 covers second fuel valve handle 38, and groove 54 formed on the back surface 52 of the fuel selector switch 30 locks second fuel valve handle 38 in an OFF position, so as to prohibit the second valve assembly 26 from moving to the ON position. Further, when selector switch 30 is in first position 56, first valve assembly 24 is able to move freely between the ON position and the OFF position, with the first fuel valve handle 34 being actuatable by the operator. In one embodiment of the invention, when first valve assembly 24 is in the ON position, first fuel valve handle 34 is in a vertical position and prevents selector switch 30 from moving horizontally from first position 56 to second position 58.

In operation, when selector switch 30 is moved from second position 58 into first position 56, second fuel valve handle 38 slides into the groove 54 formed in selector switch 30. As a result, when selector switch 30 is in first position 56, second fuel valve handle 38 is unable to move, as it is locked in place by groove 54, and second valve assembly 26 is locked in the OFF position, with movement from the OFF position to the ON position being prohibited.

IN FIG. 6, selector switch 30 is illustrated in the second position 58. When selector switch 30 is in second position 58, selector switch 30 covers first fuel valve handle 34, and groove 54 formed on the back surface 52 of the fuel selector switch 30 locks first fuel valve handle 34 in an OFF position, so as to prohibit the first valve assembly 24 from moving to the ON position. In addition, when selector switch 30 is in second position 58, second valve assembly 26 is able to freely move between the ON position and the OFF position, with the second fuel valve handle 38 being actuatable by the operator. In one embodiment of the invention, when second valve assembly 26 is in the ON position, second fuel valve handle 38 is in a vertical position and prevents selector switch 30 from moving horizontally from second position 58 to first position 56.

In operation, when selector switch 30 is moved from first position 56 into second position 58, first fuel valve handle 34 slides into groove 54 formed in selector switch 30. Therefore, when selector switch 30 is in second position 58, first fuel valve handle 34 is unable to move, as it is locked in place by groove 54, and first valve assembly 24 is locked in the OFF position, with movement from the OFF position to the ON position being prohibited.

Referring still now to FIG. 6, according to an exemplary embodiment of the invention, the fuel selector 22 of generator 10 further comprises a carburetor solenoid switch 32 that is positioned within an opening 60 formed in selector plate 28 so as to extend therethrough and is further positioned adjacent second valve assembly 26 (i.e., second fuel valve handle 38. As solenoid switch 32 is located adjacent to the second valve assembly 26—which is in turn connected to the gasoline fuel source 20—selector switch 30 covers and triggers solenoid switch 32 when slid from the second position 58 to the first position 56—by depressing the solenoid switch 32 as it comes in contact therewith. When solenoid switch 32 is triggered, a carburetor shutoff solenoid operatively connected to the solenoid switch 32 is activated and shuts off the flow of gasoline to the carburetor 16 (FIG. 2). In the preferred embodiment of the invention, solenoid switch 32 is a depressible switch, but it is contemplated that solenoid switch 32 may be another type of switch that can be activated via interaction with selector switch 30 or via interaction with either valve handle 34, 38, so as to activate the carburetor shutoff solenoid.

Beneficially, the design of the fuel selector 22 and of the selector switch 30 described herein prevents differing fuels from two separate fuel sources from flowing to the engine of a dual fuel generator at the same time. The interaction of the selector switch 30 with the first and second fuel valve assemblies 24, 26—with the selector switch 30 sliding back and forth to selectively cover/engage first and second fuel valve assemblies 24, 26—prohibits both valve assemblies from being in the "ON" position at the same time. The selector switch 30 is thus a foolproof device that prevents the mixing of fuels so as to provide additional safety to the usage of dual fuel generators.

Therefore, according to one embodiment of the invention, a fuel selector for use with a dual fuel generator includes a selector plate, a first fuel valve assembly positioned adjacent the selector plate and actuatable between an ON position and an OFF position to selectively control a first fuel flow to an engine of the dual fuel generator, and a second fuel valve assembly positioned adjacent the selector plate and actuatable between an ON position and an OFF position to selectively control a second fuel flow to the engine of the dual fuel generator. The fuel selector also includes a selector switch coupled to the selector plate so as to be linearly translatable from a first position to a second position, wherein translation of the selector switch between the first and second positions enables positioning of only one of the first fuel valve assembly and the second fuel valve assembly in the ON position at a given time, such that the first and second fuel valve assemblies cannot be in the ON position concurrently.

According to another embodiment of the invention, a method of controlling fuel flow in a dual fuel generator includes providing a first fuel valve assembly to control fuel flow from a first fuel source to an internal combustion engine of the dual fuel generator, the first fuel valve assembly including a first fuel valve handle movable between an ON position and an OFF position to control fuel flow from the first fuel source to the internal combustion engine. The method also includes providing a second fuel valve assembly to control fuel flow from a second fuel source to the internal combustion engine of the dual fuel generator, the second fuel valve assembly including a second fuel valve handle movable between an ON position and an OFF position to control fuel flow from the second fuel source to the internal combustion engine. The method further includes providing a fuel selector switch adjacent the first fuel valve assembly and the second fuel valve assembly such that the fuel selector switch is translatable to a first position and a section position, wherein the fuel selector switch is translatable between the first position and the section position to selectively inhibit actuation of the first fuel valve handle and the second fuel valve handle, so as to prevent a simultaneous flow of fuels from the first and second fuel sources to the internal combustion engine.

According to yet another embodiment of the invention, a dual fuel generator includes a first fuel source, a second fuel source, and an internal combustion engine coupled to the first fuel source and the second fuel source to selectively receive fuel therefrom. The dual fuel generator also includes a fuel selector configured to control a flow of fuel from the first and second fuel sources to the internal combustion engine, with the fuel selector comprising a first fuel valve assembly including a first fuel valve and a first fuel valve handle that is actuatable between an open position and a closed position to selectively open and close the first fuel valve, a second fuel valve assembly including a second fuel valve and a second fuel valve handle that is actuatable between an open position and a closed position to selectively open and close the second fuel valve, a selector plate having the first fuel valve assembly and the second fuel valve assembly coupled to a front side thereof, and a selector switch slideably coupled to the selector plate so as to be movable from a first position to a second position. Positioning of the selector switch in the first position causes the selector switch to cover the second fuel valve handle so as to prevent the second fuel valve handle from moving to the open position and positioning of the selector switch in the second position causes the selector switch to cover the first fuel valve handle so as to prevent the first fuel valve handle from moving to the open position.

While the invention has been described in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A fuel selector for use with a dual fuel generator, the fuel selector comprising:
   a valve assembly fluidly connected to each of a first fuel source and a second fuel source, the valve assembly being operable to selectively control a first fuel flow and a second fuel flow from the first fuel source and the second fuel source, respectively, to an engine of the dual fuel generator; and
   a selector switch positioned on the valve assembly to allow a user to manually select one of the first fuel flow and the second fuel flow;
   wherein the valve assembly comprises:
      a first fuel valve having open and closed positions to selectively control the first fuel flow to the engine; and
      a second fuel valve having open and closed positions to selectively control the second fuel flow to the engine; and
   wherein the first fuel valve and the second fuel valve are mechanical valves.

2. The fuel selector of claim 1 wherein the selector switch provides for manual actuation of the first fuel valve and the second fuel valve between the open and closed positions.

3. The fuel selector of claim 2 further comprising:
   a first valve handle coupled to the first fuel valve and actuatable between an ON position and an OFF position to selectively open and close the first fuel valve, respectively;
   a second valve handle coupled to the second fuel valve and actuatable between an ON position and an OFF position to selectively open and close the second fuel valve, respectively;
   wherein the selector switch is positioned relative to the first and second valve handles so as to provide for only one of the first and second valve handles to be in the ON position at a given time.

4. The fuel selector of claim 3 further comprising a selector plate positioned adjacent the first and second valve handles, wherein the selector switch is coupled to the selector plate so as to be movable from a first position to a second position, with movement of the selector switch between the first and second positions enabling positioning of only one of the first valve handle and the second valve handle in the ON position at a given time.

5. The fuel selector of claim 4 wherein, when the selector switch is in the first position, the first valve handle is actuatable between the ON position and the OFF position and the second valve handle is prohibited from being in the ON position; and wherein, when the selector switch is in the second position, the first valve handle is prohibited from being in the ON position and the second valve handle is actuatable between the ON position and the OFF position.

6. The fuel selector of claim 4 further comprising a carburetor solenoid switch coupled to the selector plate adjacent and extending out of a front surface thereof, the carburetor solenoid switch comprising a depressible switch configured to activate an associated solenoid when depressed.

7. The fuel selector of claim 6 wherein when the selector switch is in the first position so as to prohibit the second valve handle from being in the ON position, the selector switch depresses the carburetor solenoid switch, so as to activate the carburetor solenoid and stop the flow of the gasoline fuel source.

8. The fuel selector of claim 1 wherein the first fuel valve is attached to a liquefied petroleum gas (LPG) fuel source and wherein the second fuel valve is attached to a gasoline source.

9. The fuel selector of claim 1 wherein the mechanical valve of each of the first fuel valve and the second fuel valve is a non-solenoid valve.

10. A fuel selector for use with a dual fuel generator, the fuel selector comprising:
a valve assembly fluidly connected to each of a first fuel source and a second fuel source, the valve assembly being operable to selectively control a first fuel flow and a second fuel flow from the first fuel source and the second fuel source, respectively, to an engine of the dual fuel generator; and
at least one valve handle positioned on and operably connected to the valve assembly to actuate the valve assembly to enable one of the first fuel flow and the second fuel flow to the engine;
wherein the valve assembly comprises:
a first fuel valve having open and closed positions to selectively control the first fuel flow to the engine; and
a second fuel valve having open and closed positions to selectively control the second fuel flow to the engine; and
wherein the at least one valve handle is mechanically coupled to the first fuel valve and the second fuel valve to selectively open and close the first fuel valve and the second fuel valve responsive to actuation thereof.

11. The fuel selector of claim 10 wherein the at least one valve handle enables only one of the first fuel flow and the second fuel flow to the engine at a given time.

12. The fuel selector of claim 10 wherein the at least one valve handle comprises:
a first valve handle coupled to the first fuel valve and actuatable between an ON position and an OFF position to selectively open and close the first fuel valve, respectively;
a second valve handle coupled to the second fuel valve and actuatable between an ON position and an OFF position to selectively open and close the second fuel valve, respectively.

13. The fuel selector of claim 12 further comprising a selector switch positioned relative to the first and second valve handles so as to provide for only one of the first and second valve handles to be in the ON position at a given time.

14. The fuel selector of claim 13 further comprising a selector plate positioned adjacent the first and second valve handles, wherein the selector switch is coupled to the selector plate so as to be movable from a first position to a second position, with movement of the selector switch between the first and second positions enabling positioning of only one of the first valve handle and the second valve handle in the ON position at a given time.

15. The fuel selector of claim 14 wherein, when the selector switch is in the first position, the first valve handle is actuatable between the ON position and the OFF position and the second valve handle is prohibited from being in the ON position; and wherein, when the selector switch is in the second position, the first valve handle is prohibited from being in the ON position and the second valve handle is actuatable between the ON position and the OFF position.

16. The fuel selector of claim 10 wherein the first fuel source comprises liquefied petroleum gas (LPG) and the second fuel source comprises gasoline.

17. A fuel selector of a dual fuel generator comprising: a selector switch having a first fuel mode and a second fuel mode; a solenoid switch having open and closed positions; and a fuel solenoid having open and closed positions; wherein, when the selector switch is in the first fuel mode, the solenoid switch and the fuel solenoid are in the closed positions and when the selector switch is in the second fuel mode, the solenoid switch and the fuel solenoid are in the open positions, wherein the selector switch triggers the solenoid switch when changed from the second fuel mode to the first fuel mode, so as to cause the solenoid switch and the fuel solenoid to operate in the closed positions, and a valve assembly positioned on or adjacent the selector switch and fluidly connected to each of a first fuel source and a second fuel source, the valve assembly being operable to selectively control a first fuel flow and a second fuel flow from the first fuel source and the second fuel source, respectively, to an engine of the dual fuel generator; and wherein positioning of the selector switch in the first fuel mode and the second fuel mode enables a selection of one of the first fuel flow and the second fuel flow.

18. A fuel selector for use with a dual fuel generator, the fuel selector comprising: a valve assembly fluidly connected to each of a first fuel source and a second fuel source, the valve assembly being operable to selectively control a first fuel flow and a second fuel flow from the first fuel source and the second fuel source, respectively, to an engine of the dual fuel generator; and a selector switch positioned on the valve assembly to allow a user to manually select one of the first fuel flow and the second fuel flow; wherein the valve assembly comprises: two fuel inputs, with a first fuel input connected to the first fuel source and a second fuel input connected to the second fuel source; and two fuel outputs supplying fuel from only one of the first fuel source or the second fuel source, wherein the valve assembly comprises a first fuel valve having open and closed positions to selectively control the first fuel flow to the engine; and a second fuel valve having open and closed positions to selectively control the second fuel flow to the engine.

19. The fuel selector of claim 18, wherein the first fuel valve and the second fuel valve are non-solenoid, mechanical valves.

* * * * *